United States Patent [19]

Patercsak et al.

[11] Patent Number: 5,613,698
[45] Date of Patent: Mar. 25, 1997

[54] WRAPPED INFLATABLE RESTRAINT

[75] Inventors: Patrick E. Patercsak, St. Clair Shores; James W. Essad, Sandusky, both of Mich.

[73] Assignee: TRW Vehicle Safety Systems Inc., Lyndhurst, Ohio

[21] Appl. No.: 448,921

[22] Filed: May 25, 1995

[51] Int. Cl.[6] .................................................. B60R 21/20
[52] U.S. Cl. ..................... 280/728.1; 280/732; 280/743.1
[58] Field of Search ................................ 280/728.2, 729, 280/730.1, 743.1, 743.2, 728.3, 728.1, 732, 731

[56] References Cited

U.S. PATENT DOCUMENTS

| | | | |
|---|---|---|---|
| 3,752,501 | 8/1973 | Daniel et al. | 280/729 |
| 4,964,654 | 10/1990 | Bishop et al. | 280/728.2 |
| 5,195,775 | 3/1993 | Komerska et al. | 280/728.2 |
| 5,234,227 | 8/1993 | Webber | 280/728.1 |
| 5,290,061 | 3/1994 | Bollaert | 280/743.1 |
| 5,447,329 | 9/1995 | Hamada | 280/728.3 |

Primary Examiner—Brian L. Johnson
Assistant Examiner—Peter C. English
Attorney, Agent, or Firm—Tarolli, Sundheim, Covell, Tummino & Szabo

[57] ABSTRACT

An air bag (12) for restraining an occupant (14) of a vehicle (16) has a deflated condition and an inflated condition. The air bag (12) has layers (20, 22) defining between them an inflation fluid volume (18) into which inflation fluid is directed to inflate the air bag. A fluid impermeable wrap (140) encircles the air bag (12) when the air bag is in the deflated condition. The wrap (140) has fluid inlet openings (190, 192) for receiving inflation fluid and for directing inflation fluid into a predetermined portion (120) of the folded air bag (12) to cause the predetermined portion to inflate first.

21 Claims, 6 Drawing Sheets

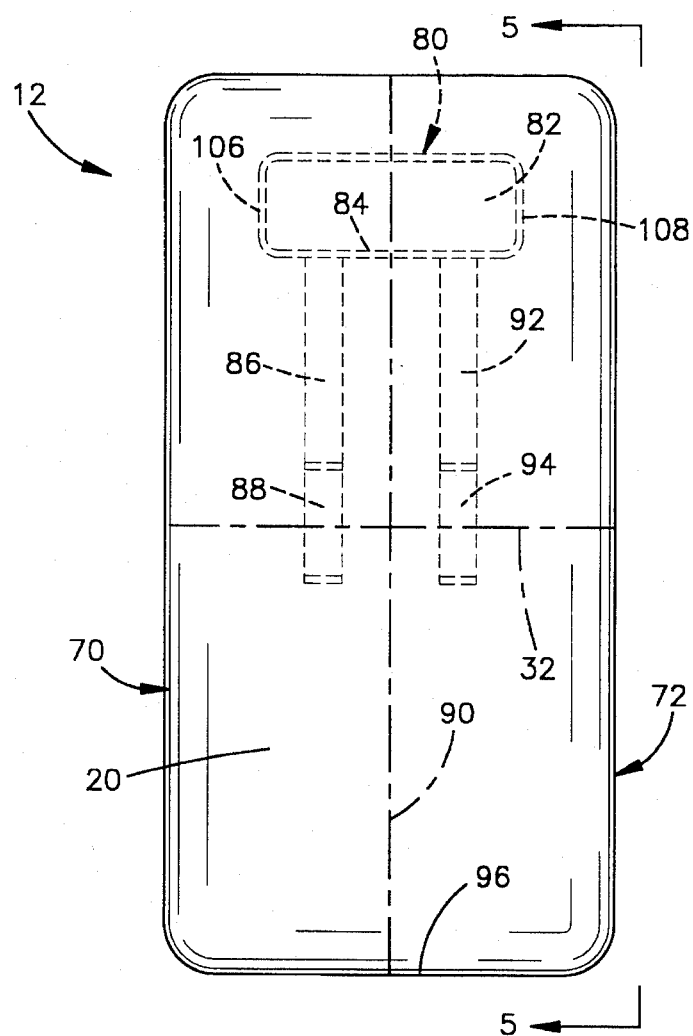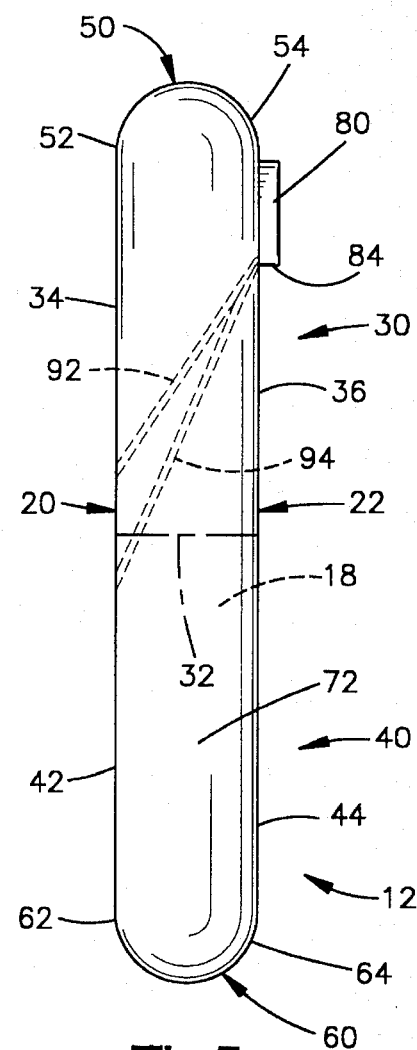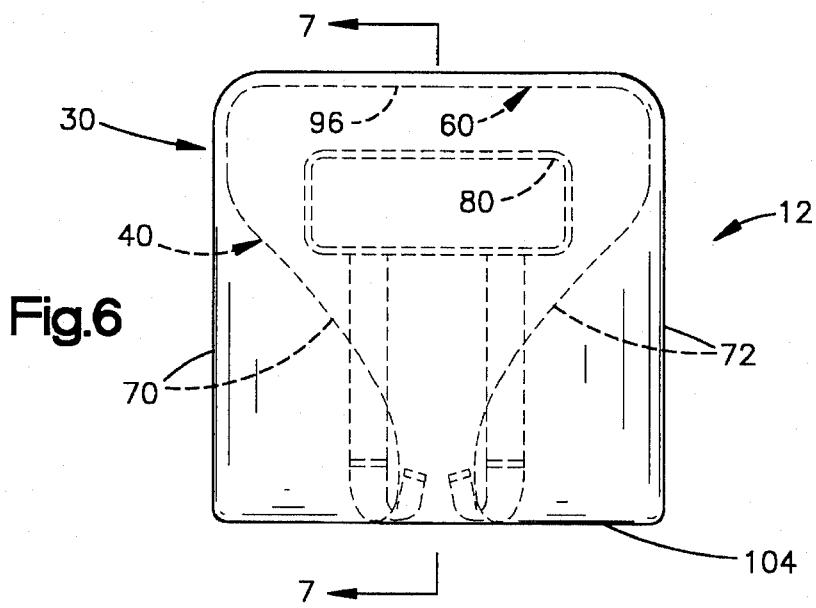

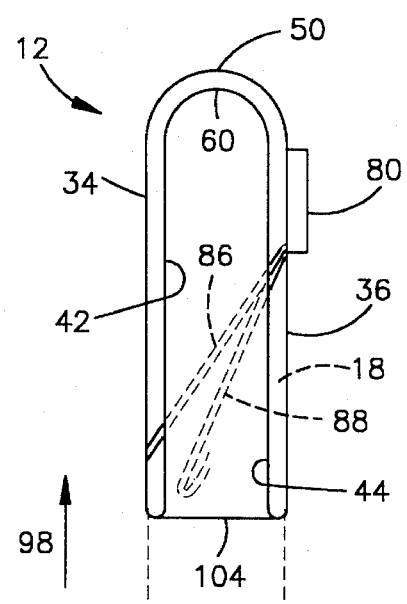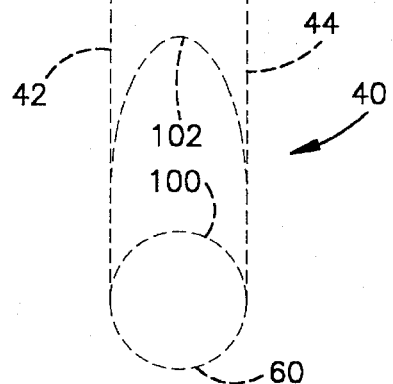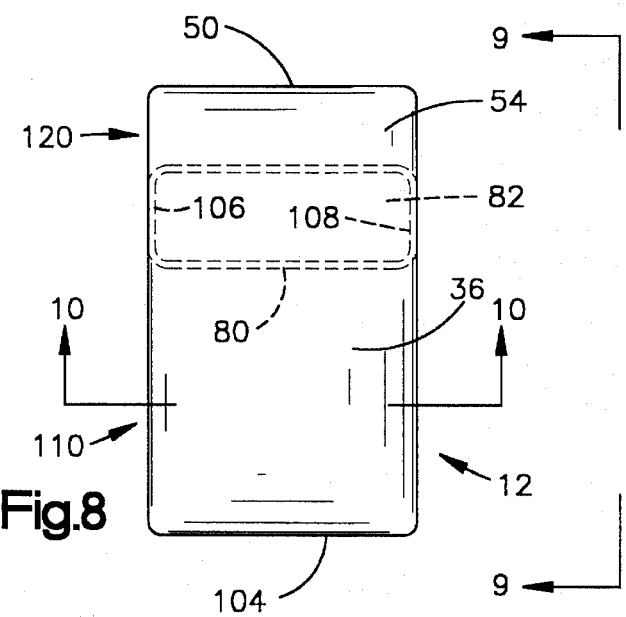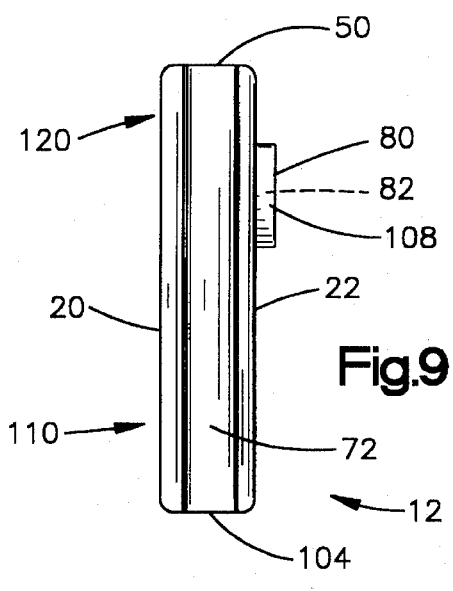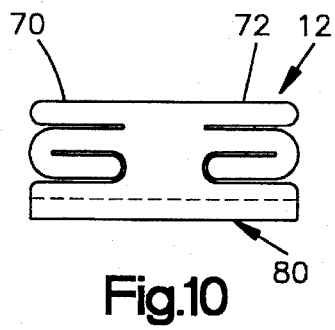

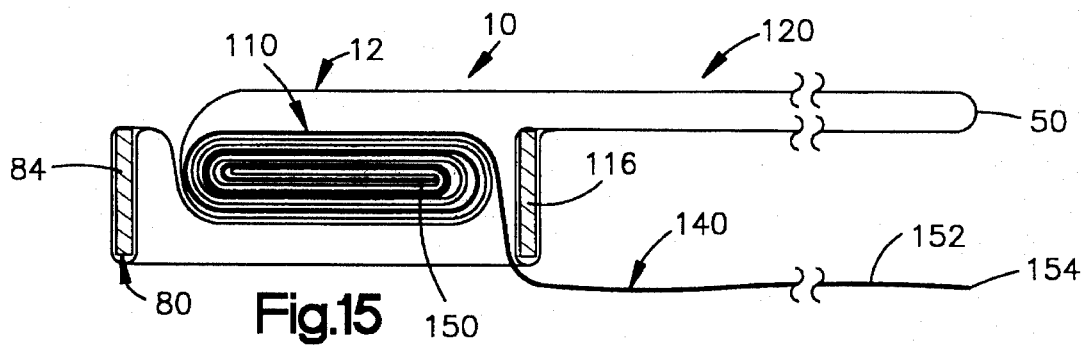
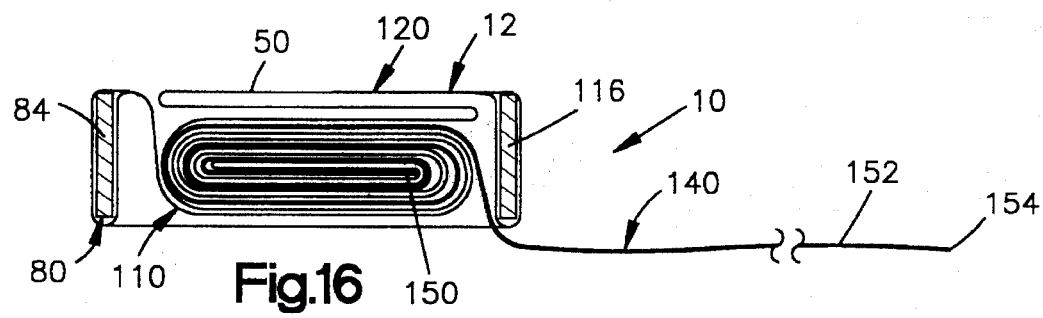
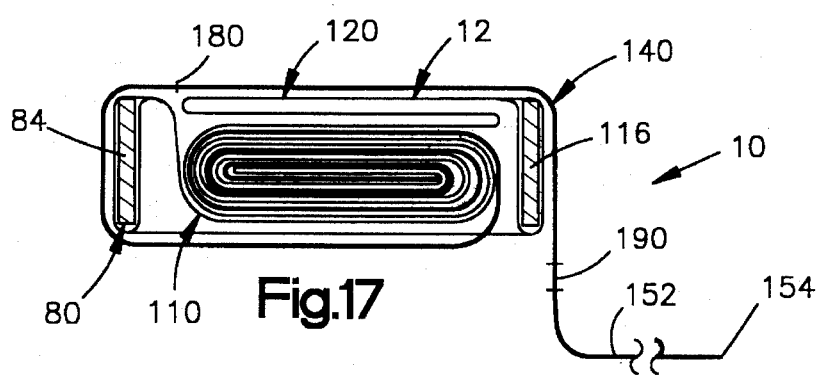
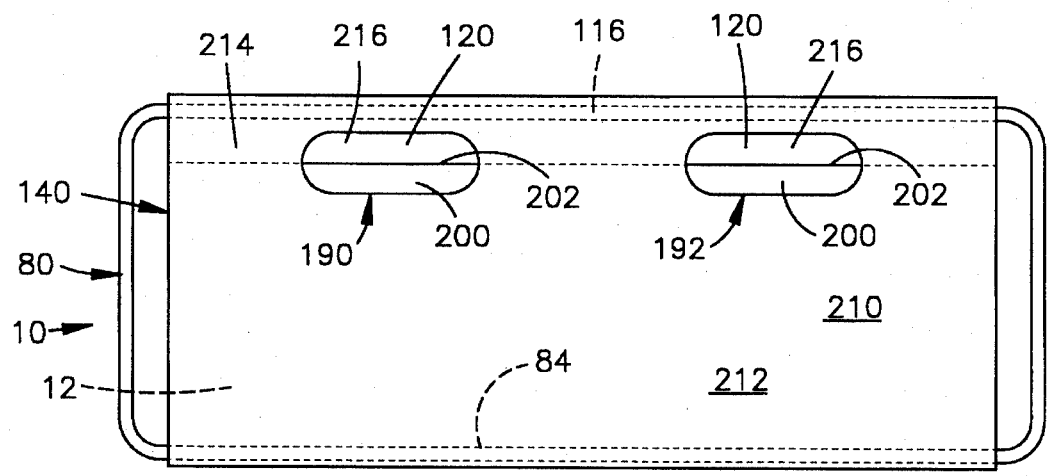

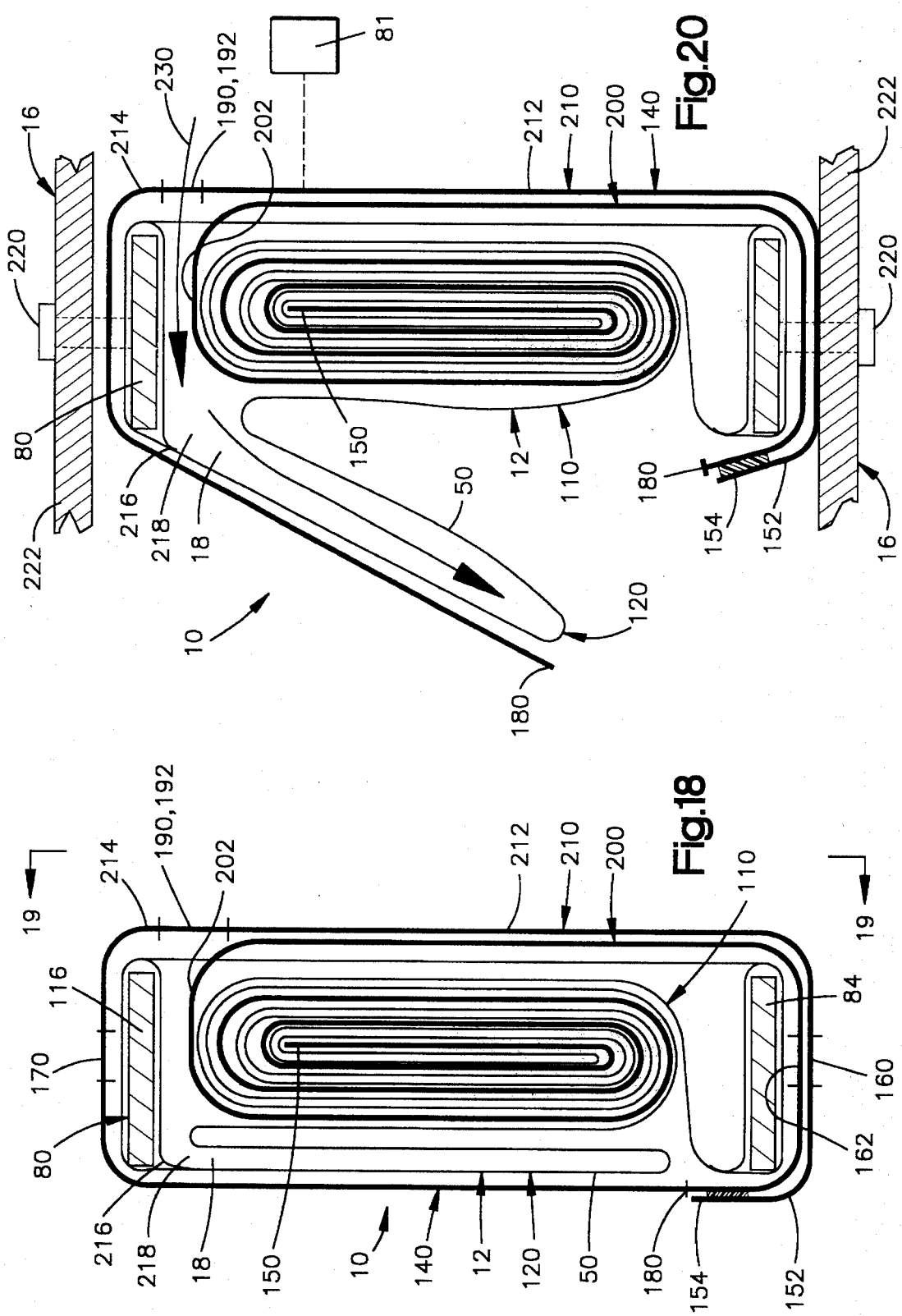

WRAPPED INFLATABLE RESTRAINT

BACKGROUND OF THE INVENTION

1. Technical Field

The present invention relates to an inflatable vehicle occupant restraint, such as an air bag, which is inflatable to protect an occupant of a vehicle.

2. Description of the Prior Art

An air bag for protecting an occupant of a vehicle is commonly supported in a deflated condition at a location in the vehicle such as the instrument panel or steering wheel of the vehicle. The air bag may be covered with a flexible plastic wrap. An inflator associated with the air bag is actuated to inflate the air bag during sudden vehicle deceleration of a magnitude which requires inflation of an air bag to help protect the vehicle occupant. The force of the inflating air bag opens a tear seam in the wrap to enable deployment of the air bag.

It is preferable that an air bag, when inflating, not brush against the head or upper torso of a vehicle occupant. This is especially desirable if the vehicle occupant is not close to or against the vehicle seat back when the inflator is actuated.

SUMMARY OF THE INVENTION

The present invention is a vehicle safety apparatus comprising an inflatable vehicle occupant restraint having a deflated condition and having an inflated condition for protecting an occupant of a vehicle. A flexible wrap encircles the inflatable restraint when the inflatable restraint is in the deflated condition. The flexible wrap has an opening for receiving inflation fluid and for directing inflation fluid into a predetermined portion of the inflatable restraint to cause the predetermined portion to inflate first.

BRIEF DESCRIPTION OF THE DRAWINGS

The foregoing and other features of the present invention will become apparent to one of ordinary skill in the art to which the present invention relates upon consideration of the following description of the invention with reference to the accompanying drawings, wherein:

FIG. 4 is a front elevational view of the air bag of FIG. 1 in a deflated and unfolded condition;

FIG. 5 is a side elevational view of the air bag of FIG. 4 as viewed along line 5—5 of FIG. 4;

FIG. 6 is a schematic illustration of the air bag of FIG. 4 after an initial fold of a lower section of the air bag upward into an upper section of the air bag;

FIG. 7 is a schematic sectional view of the partially folded air bag of FIG. 6, taken along line 7—7 of FIG. 6;

FIG. 8 is a front elevational view of the air bag of FIG. 6 after folding of the sides of the air bag;

FIG. 9 is a side elevational view of the air bag of FIG. 8 as viewed along line 9—9 of FIG. 8;

FIG. 10 is a sectional view taken along line 10—10 of FIG. 8 and further illustrating the folded sides of the air bag;

FIG. 14 through 18 are a series of views illustrating schematically the final rolling and folding of parts of the air bag and the wrap, prior to placement of the vehicle safety apparatus in the vehicle;

FIG. 19 is a view taken along line 19—19 of FIG. 18; and

FIG. 20 is a view similar to FIG. 18 showing an initial stage in the inflation of the air bag.

DESCRIPTION OF PREFERRED EMBODIMENTS

Figure 1:
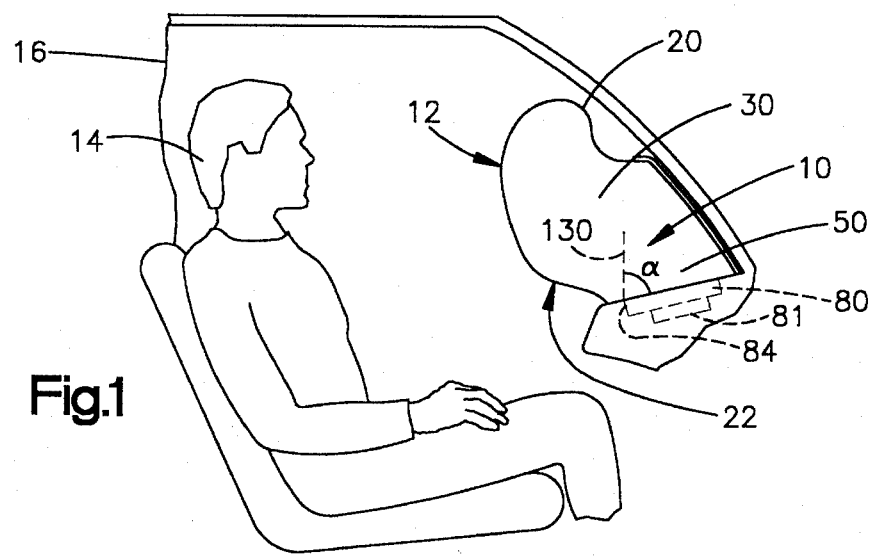
FIGS. 1 through 3 are a series of schematic views illustrating a vehicle safety apparatus in accordance with the present invention including an air bag inflating in a vehicle.

The present invention relates to an inflatable vehicle occupant restraint, such as an air bag, which is inflatable to help protect an occupant of a vehicle. The present invention is applicable to various inflatable restraint constructions. As representative of the present invention, FIG. 1 illustrates a vehicle safety apparatus 10 which includes a specific inflatable vehicle occupant restraint, i.e., air bag 12. The air bag 12 is inflatable to help protect an occupant 14 of a vehicle 16 by restraining movement of the occupant in a direction toward the front of the vehicle, that is, to the right as viewed in FIG. 1. The vehicle safety apparatus 10 also includes a wrap 140 (FIGS. 11–20) which is associated with the air bag 12 and which is described below in detail.

The air bag 12 (FIGS. 4 and 5) includes two layers of a material (preferably a fabric such as woven nylon) which define between them an inflation volume 18 into which an inflation fluid is directed to inflate the air bag. The two layers include a front panel 20, which is disposed closest to the vehicle occupant 14 when the air bag 12 is inflated, and a back panel 22, which is disposed farthest from the vehicle occupant when the air bag is inflated. The front and back panels 20 and 22 may be separate fabric pieces sewn together, or may be formed as one piece of fabric.

The air bag 12 has an upper section 30 located above (as viewed in FIGS. 4 and 5) an imaginary horizontal midline 32 of the air bag. The air bag upper section 30 includes an upper portion 34 of the front panel 20 and an upper portion 36 of the back panel 22. The air bag 12 has a lower section 40 located below (as viewed in FIGS. 4 and 5) the midline 32. The air bag lower section 40 includes a lower portion 42 of the front panel 20 and a lower portion 44 of the back panel 22.

An upper end portion 50 of the air bag 12 includes upper end portions 52 and 54 of the front and back panels 20 and 22, respectively. A lower end portion 60 of the air bag 12 includes lower end portions 62 and 64 of the front and back panels 20 and 22, respectively. The air bag 12 has a left side section 70 and a right side section 72 located on the left and right sides, respectively, (as viewed in FIG. 4) of an imaginary vertical midline 90 of the air bag 12.

The air bag 12 includes a retaining ring or retainer 80 secured to and extending outward from the back panel 22. When the air bag 12 is mounted in the vehicle 16, the retainer 80 is coupled to an air bag inflator 81 (shown schematically in FIGS. 1–3) on the vehicle 16 to secure the air bag 12 to the inflator. The retainer 80 defines an inflation fluid opening 82 in the back panel 22 through which inflation fluid from the inflator 81 is directed to inflate the air bag 12. The retainer 80 is preferably a known box-shaped metal member which has a circumference large enough to contain substantially all the fabric material of the air bag 12 when the air bag is in a deflated condition.

A plurality of internal tethers extend inside the air bag 12 from the back panel 22, at the lower side 84 of the retainer 80, to the front panel 20. A left upper tether 86 and a left lower tether 88 are located to the left (as viewed in FIG. 4) of the imaginary vertical midline 90 of the air bag 12. A right upper tether 92 and a right lower tether 94 are located to the right (as viewed in FIG. 4) of the imaginary vertical midline 90.

For mounting in the vehicle 16, the air bag 12 is first folded in the manner illustrated in FIGS. 6 and 7. (Since portions of the air bag 12 are rolled rather than folded per se, the term "folded" as used herein should be read in context to mean or to include "rolled", as appropriate). In this initial fold, the lower section 40 of the air bag 12 is, in effect, turned "inside out" and folded up ("tucked up") inside the upper section 30 of the air bag. To fold the air bag 12 in this manner, the air bag lower end portion 60 is moved upwardly, in a direction as indicated by the arrow 98 (FIG. 7), inside the inflation fluid volume 18 between the front panel 20 and the back panel 22. The lower end portion 60 is moved upward as shown schematically in FIG. 7, past the intermediate positions illustrated by the dashed lines 100 and then 102, until the lower end portion is adjacent the upper end portion 50, as shown in solid lines in FIG. 7. While the air bag lower end portion 60 is being moved upward, it passes between the left tethers 86 and 88 on one side and the right tethers 92 and 94 on the other side. When the air bag lower end portion 60 is adjacent the upper end portion 50, the material of the lower end portion is then spread out sideways as much as possible along the upper end portion.

This initial tuck fold can be described in another way with reference to folding the air bag 12 by hand (it is preferred that the air bag 12 be folded by machine). If this initial tuck fold is done by hand, the mid-portion 96 of the air bag lower end portion 60 is grasped with one hand and pushed upwardly, inside the inflation fluid volume 18 between the front panel 20 and the back panel 22, and between the left tethers 86 and 88 on one side and the right tethers 92 and 94 on the other side. The lower end portion 60 is pushed upward until it is adjacent the upper end portion 50. Then, both hands are inserted into the air bag 12 and moved sideways apart from each other, so that the air bag lower end portion 60 is spread out sideways as much as possible along the upper end portion 50.

When this initial tuck fold is completed, the air bag 12 is in the partially folded condition shown in FIGS. 6 and 7. The air bag lower section 40 is turned inside out and is located inside the air bag upper section 30. The lower portion 44 of the back panel 22 and the lower portion 42 of the front panel 20 are received between the upper portion 36 of the back panel 22 and the upper portion 34 of the front panel 20. The panel upper portions 36 and 34 form the upper section 30 of the air bag 12 when the air bag is inflated. The panel lower portions 44 and 42 form the lower section 40 of the air bag 12 when the air bag is inflated. In this partially folded condition, the height of the air bag 12, that is, the distance between the upper end portion 50 and the bottom portion 104 of the partially folded air bag, is about half that of the air bag prior to folding.

It should be understood that an air bag in accordance with the present invention need not have internal tethers such as the tethers 86, 88, 92 and 94. In such a case, the lower end portion 60 of the air bag 12 is more easily pushed directly into position adjacent the upper end portion 50.

The air bag side sections 70 and 72 are then folded inward toward the retainer 80 until the air bag is not wider than the retainer. The side sections 70 and 72 may be folded by pleating and rolling as indicated schematically in FIG. 10. Thus, the left side section 70 is folded inward until it does not extend outward of the left side 106 of the retainer 80. The right side section 72 is folded inward until it does not extend outward of the right side 108 of the retainer 80. Alternatively, the side sections 70 and 72 of the air bag 12 may be folded inward by rolling alone or by pleating alone, in a known manner not shown.

When the side sections 70 and 72 of the air bag 12 are folded, the air bag is in the folded condition shown in FIGS. 8 and 9. In this condition, a first part 110 of the air bag 12 is disposed on one side of (below as viewed in FIGS. 8 and 9) the inflation fluid opening 82 and the retainer 80. A second part 120 of the air bag 12 is disposed on the opposite side of (above as viewed in FIGS. 8 and 9) the inflation fluid opening 82 and the retainer 80. It should be understood that the second part 120 of the air bag 12 typically is longer than as shown in FIGS. 8 and 9.

Figure 11:
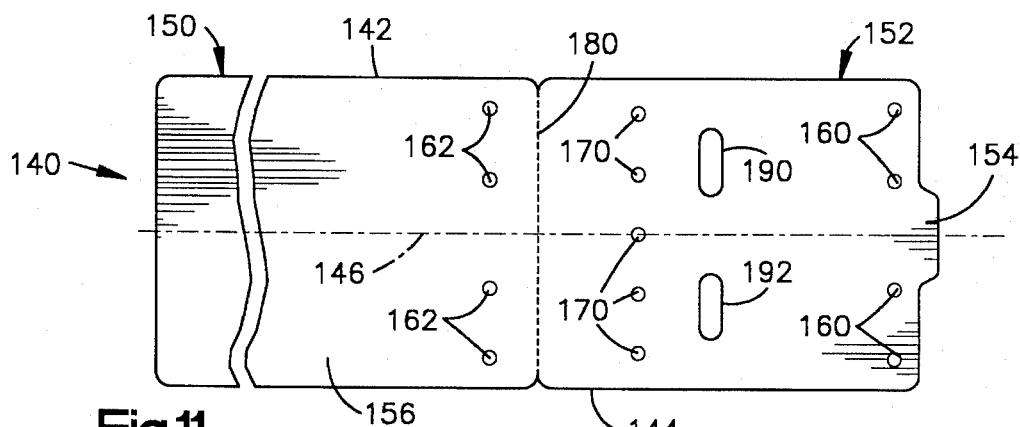
FIG. 11 is a plan view of a wrap which is associated with the air bag and which is included in the vehicle safety apparatus of FIG. 1.
Figure 12:
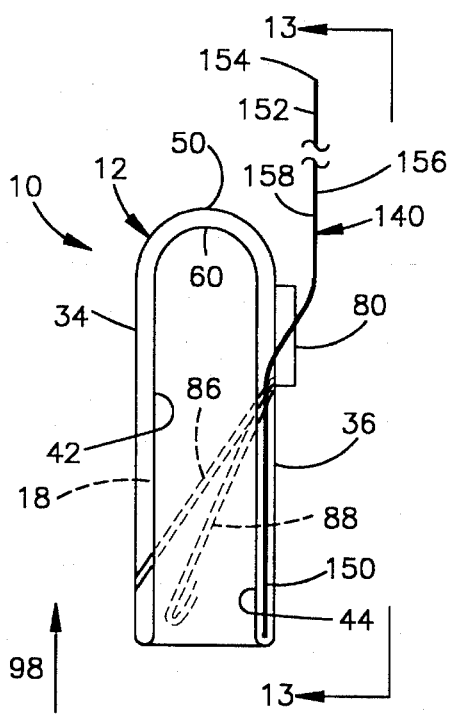
FIG. 12 is a view similar to FIG. 7 illustrating the initial placement of the wrap in the partially folded air bag.
Figure 13:
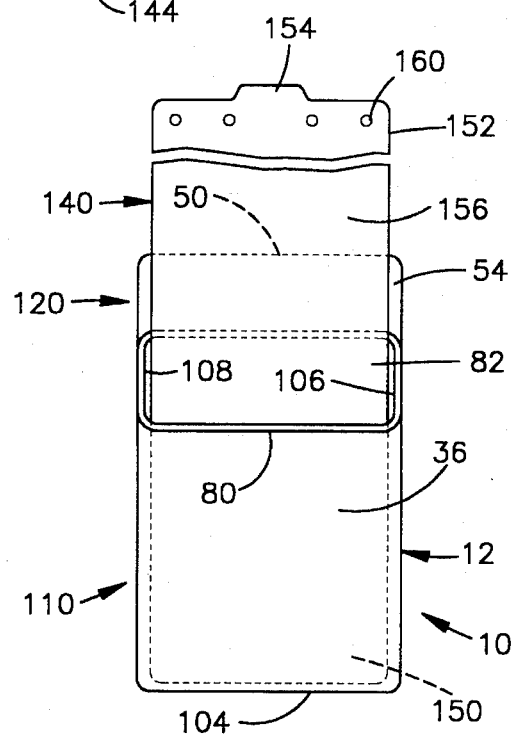
FIG. 13 is a view similar to FIG. 8 and taken along line 13—13 of FIG. 12.

The wrap 140 is next associated with the partially folded air bag 12 as shown in FIGS. 12 and 13. The wrap 140 (FIG. 11) is made from a flexible tear-resistant sheet material which is impermeable to the inflation fluid from the inflator 81. The wrap 140 preferably has a thickness of about one-half mil (about 0.0005 inches). A preferred material for the wrap 140 is Tyvek® brand polyethylene plastic which is available from E. I. DuPont de Nemours & Co. of Delaware.

The wrap 140 has a generally rectangular configuration when laid flat as shown in FIG. 11. First and second side edges 142 and 144 of the wrap 140 extend parallel to a longitudinal central axis 146 of the wrap. The axis 146 extends between first and second end portions 150 and 152 of the wrap 140. A glue tab 154 projects from the second end portion 152 of the wrap 140. The wrap 140 has first and second opposite side surfaces 156 and 158 (FIG. 12).

A first set of four lower retainer attachment openings 160 (FIG. 11) are disposed in the wrap 140 at a location adjacent to the glue tab 154. The wrap 140 includes a second set of four lower retainer attachment openings 162 at a location spaced apart axially from the openings 160. Five upper retainer attachment openings 170 are formed in the wrap 140 at a location intermediate the lower retainer attachment openings 160 and 162.

A tear seam 180 extends between the first and second side edges 142 and 144 of the wrap 140 in a direction perpendicular to the axis 146. The tear seam 180 is formed in a known manner, such as by weakening or perforating the material of the wrap 140.

A pair of fluid inlet openings 190 and 192 in the wrap 140 are located between the upper retainer attachment openings 170 and the lower retainer attachment openings 160. The fluid inlet openings 190 and 192 are spaced apart on opposite sides of the axis 146. Each of the fluid inlet openings 190 and 192 has a generally oval configuration as seen in FIG. 11. The openings 190 and 192 could have a different configuration. The fluid inlet openings 190 and 192 extend through the material of the wrap 140 between the first and second side surfaces 156 and 158.

Figure 14:
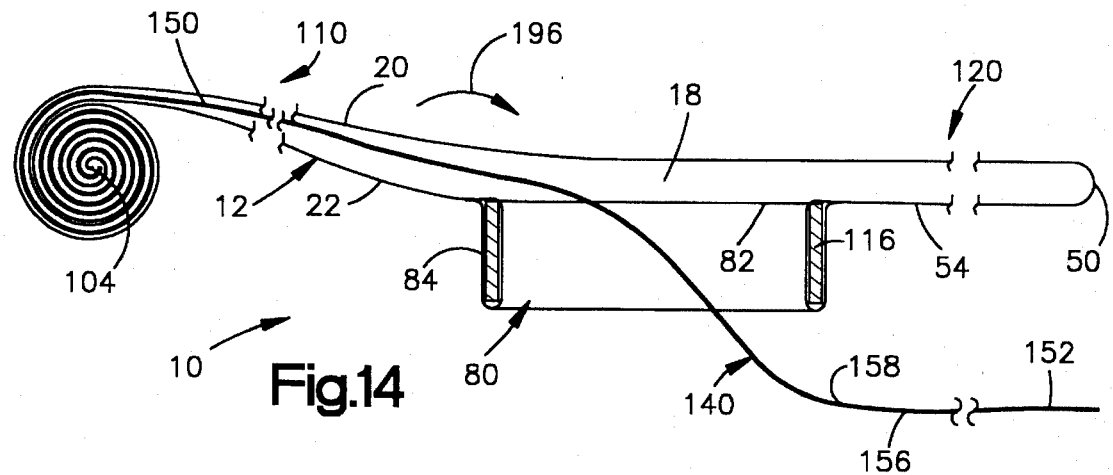

The wrap 140 is inserted into the partially folded air bag 12 in a manner as shown in FIGS. 12 and 13. The first end portion 150 of the wrap 140 is inserted through the retainer 80 and through the inflation fluid opening 82 of the air bag 12 to a position adjacent to the bottom portion 104 of the partially folded air bag 12. The first end portion 150 of the wrap 140 extends in the inflation fluid volume 18 between the upper portion 36 of the back panel 22 and the lower portion 44 of the back panel 22. The second end portion 152 of the wrap 140 projects from the inflation fluid opening 82 of the air bag 12 and from the retainer 80, as shown in FIGS. 12–14. The lower retainer attachment openings 160 and 162, the upper retainer attachment openings 170, the tear seam 180, and the fluid inlet openings 190 and 192 are all disposed outside of the partially folded air bag 12.

The air bag 12 and the wrap 140 are then folded and rolled up as illustrated schematically in FIGS. 13–16. In the first step of this process, the first part 110 of the partially folded air bag 12 is rolled up toward the retainer 80 as seen in FIG. 14. The bottom portion 104 of the air bag 12 is rolled up under the front and back panels 20 and 22 toward the retainer 80, rolling up the front and back panels 20 and 22, until the roll reaches the bottom side 84 of the retainer. The lower end portion 150 of the wrap 140 is rolled up together with the first part 110 of the air bag 12. The roll is then moved over the bottom side 84 of the retainer 80, in a direction as shown by the arrow 196 (FIG. 14), into a position inside the retainer 80 as shown schematically in FIG. 15.

Next, the second part 120 of the air bag 12, including the upper end portion 50 of the air bag, is folded into a position inside the retainer 80 as shown schematically in FIG. 16. In this condition, the upper end portion 50 of the air bag 12 is outermost (to the top as viewed in FIG. 16) in the retainer 80. It is preferred that all or substantially all of the air bag 12 be disposed within the retainer 80 for mounting in the vehicle 16. It is contemplated, however, that some of the air bag 12 may extend out of the generally rectangular volume defined by the retainer 80 when the air bag is in the condition shown in FIG. 16.

The portion of the wrap 140 disposed outside of the air bag 12 is next wrapped around the folded air bag 12 and the retainer 80 as shown in FIGS. 17–19. Specifically, the portions of the wrap 140 which project from the inflation fluid opening 82 in the air bag 12 are moved in a clockwise direction as viewed in FIGS. 17 and 18 so as to encircle the air bag and the retainer 80. When the wrapping process is completed as shown in FIG. 18, the lower retainer attachment openings 160 and 162 overlie the lower side 84 of the retainer 80. The upper retainer attachment openings 170 overlie the upper side 116 of the retainer 80. Locator pins on the retainer 80 and corresponding openings in the wrap 140, although not shown, are preferably provided to ensure registration of the retainer attachment openings 160, 162 and 170 with fastener openings (not shown) in the sides 84 and 116, respectively, of the retainer.

The glue tab 154 is glued down to a portion of the wrap 140 which underlies the glue tab. The tear seam 180 is disposed on the left side (as viewed in FIG. 18) of the vehicle safety apparatus 10, adjacent to the glue tab 154. The fluid inlet openings 190 and 192 are disposed on the opposite side (the right side as viewed in FIGS. 18 and 20) of the vehicle safety apparatus 10 from the tear seam 180.

A first layer 200 (FIG. 18) of the wrap 140 covers the rolled first part 110 of the air bag 12. The first layer 200 of the wrap 140 has an upper portion 202 which is visible through the fluid inlet openings 190 and 192. A second layer 210 of the wrap 140 has a first section 212 which overlies the first layer 200 of the wrap 140. The second layer 210 of the wrap 140 has a second section 214 which extends generally above (as viewed in FIGS. 18–20) the upper portion 202 of the first layer 200. The second section 214 of the second layer 210 of the wrap 140 includes the fluid inlet openings 190 and 192. The fluid inlet openings 190 and 192 are disposed adjacent to the upper portion 202 of the first layer 200 of wrap 140 on the rolled first part 110 of the air bag 12.

A portion 216 (FIGS. 18 and 20) of the air bag 12 is disposed adjacent to the upper portion 202 of the first layer 200 of the wrap 140. The portion 216 of the air bag 12 includes a pocket 218 of the inflation fluid volume 18 formed by the folded second part 120 of the air bag. The second section 214 of the second layer 210 of the wrap 140 overlies the portion 216 of the air bag 12 which includes the pocket 218. The first layer 200 of the wrap 140 does not extend between the portion 216 of the air bag 12 and the second section 214 of the second layer 210 of the wrap 140.

The vehicle safety apparatus 10 including the air bag 12 and the wrap 140 is secured in the vehicle 16 adjacent to the inflator 81. Fasteners such as rivets 220 extend through the retainer attachment openings 160, 162 and 170 and through the retainer 80 and secure the vehicle safety apparatus 10 to a portion of the vehicle 16 such as an air bag module canister or housing 222. The wrapped air bag 12 is preferably mounted in a canister or housing in a manner so as to constrain inflation fluid from the inflator 81 to flow into the fluid inlet openings 190 and 192 in the wrap 140. In the vehicle 16 illustrated in FIGS. 1–3, the retainer 80 with the folded air bag 12 inside it, is mounted to lie in a plane that is at an angle $\alpha$ (FIG. 1) of about 70° to 80° from an imaginary vertical line 130. The bottom side 84 of the retainer 80 is disposed closest to the vehicle occupant 14. This is generally referred to as a "top mount" configuration.

When the air bag 12 and the wrap 140 are thus associated with the inflator 81, the rolled first part 110 of the air bag 12, covered with the first layer 200 of the wrap 140, is presented toward the inflator. The first layer 200 of the wrap 140 extends between the rolled first part 110 of the air bag 12 and the inflator 81. The first section 212 of the second layer 210 of the wrap 140 also extends between the rolled first part 110 of the air bag 12 and the inflator 81.

The only portion of the wrap 140 which extends between the inflator 81 and the portion 216 of the air bag 12 is the second section 214 of the second layer 210 of the wrap. The fluid inlet openings 190 and 192 in the second section 214 of the second layer 210 of the wrap 140 are presented toward the inflator 81. The portion 216 of the air bag 12, which is also presented toward the inflator 81, is exposed to the inflator through the fluid inlet openings 190 and 192. The tear seam 180 in the wrap 140 is disposed on the opposite side of the air bag 12 from the fluid inlet openings 190 and 192 and is presented generally upward and rearward in the vehicle 16, that is, in a direction up and to the left as viewed in FIG. 1.

In the event of a vehicle emergency situation such as sudden vehicle deceleration which requires inflation of the air bag 12 to help protect the vehicle occupant 14, the inflator 81 is actuated, in a known manner, to direct inflation fluid toward and into the air bag 12 to inflate the air bag. The inflation fluid flows from the inflator 81 and contacts the vehicle safety apparatus 10. The inflation fluid first contacts the outermost second layer 210 of the wrap 140 on the air bag 12. The inflation fluid can not pass through the impermeable material of the second layer 210 of the wrap 140. Thus, the inflation fluid flows through the fluid inlet openings 190 and 192 in a direction as indicated by the arrow 230 (FIG. 20).

A first portion of the inflation fluid which flows through the fluid inlet openings 190 and 192 contacts the first layer 200 of the wrap 140. The first layer 200 of the wrap 140 temporarily blocks the flow of inflation fluid into the first part 110 of the air bag 12.

A second portion of the inflation fluid which flows through the fluid inlet openings 190 and 192 flows into the air bag portion 216 including the pocket 218 formed by the folded second part 120 of the air bag 12. This second portion of the inflation fluid inflates the second part 120 of the air bag 12 which pushes outward (to the left as viewed in FIGS. 18 and 20) on the wrap 140. The wrap 140 breaks at the tear seam 180 and opens in a manner as shown schematically in FIG. 20.

The opening of the wrap 140 allows the second part 120 of the air bag 12 to move out of the retainer 80 and inflate. The second part 120 of the air bag 12 unfolds as it inflates, in a manner substantially the reverse of the folding process shown in FIGS. 15 and 16. The upper end portion 50 of the air bag 12 fills quickly in a bubble-like manner. As a result, the portion of the air bag 12 which inflates and unfolds first is the second part 120 which includes the upper end portion 50.

As the remaining portions of the air bag 12 inflate, some portions of the wrap 140 remain connected with the retainer 80, while other portions of the wrap remain inside the inflated air bag. The first part 110 of the air bag unrolls and the side sections 70 and 72 inflate and unfold. The internal tethers 86, 88, 92 and 94 help keep the air bag 12 from inflating upward toward the roof of the vehicle 16.

The air bag 12 is then in the partially inflated condition shown in FIG. 1. The upper section 30 of the air bag 12 is inflated and is generally in position in front of the head and upper torso of the vehicle occupant 14. The lower section 40 of the air bag 12 (not shown in FIG. 1) is still tucked or folded inside the upper section 30.

The air bag lower section 40 is the final part of the air bag 12 to inflate and unfold. Inflation fluid from the inflator 81 continues to be directed into the inflation fluid volume 18 between the air bag front panel 20 and the back panel 22. The lower end portion 60 (FIG. 7) of the air bag 12 moves down and away from its folded position adjacent the upper end portion 50. The lower section 40 (FIG. 1) of the air bag 12 comes out of the upper section 30, and the air bag 12 is in the inflated condition shown in FIG. 3. The tuck fold, i.e., the fold of the air bag lower section 40 up into the upper section 30 as shown in FIGS. 6 and 7, is the last to unfold. The lower section 40 of the air bag 12 is the last part of the bag to inflate.

Folding the lower section 40 of the air bag 12 and turning it inside out into the upper section 30, in the manner described above, limits the free length of the air bag 12 which reaches out towards the vehicle occupant 14 when the air bag inflates. The inflating air bag 12 extends out only about half the distance toward the vehicle occupant 14, then the lower section 40 pops out from the upper section 30 as shown. This tends to reduce the possibility that the air bag 12 may brush against the face or upper torso of the vehicle occupant 14 as the bag is inflating. This is especially advantageous if the vehicle occupant is out of position, i.e., is closer than desired to the air bag 12 when the air bag begins to inflate.

Figure 2:
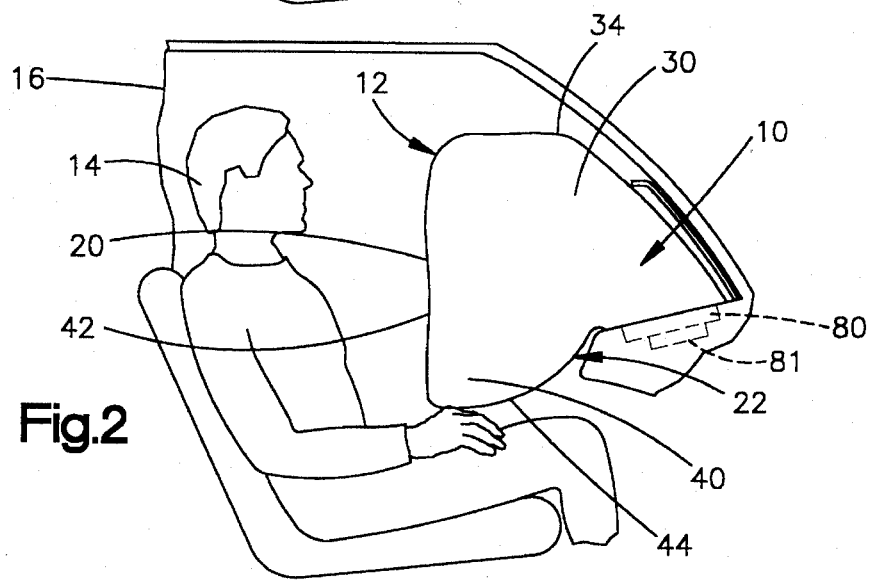
Figure 3:
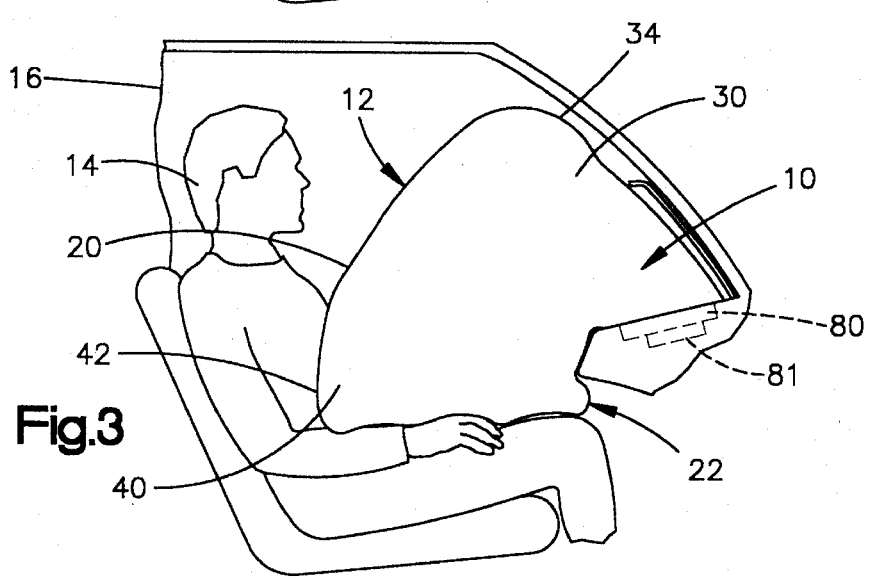

As illustrated in FIGS. 1-3, the air bag 12 is disposed in the vehicle 16 in a top mount configuration. It should be understood that the present invention is applicable to other mounting configurations as well, in which case the relative lengths of the first and second parts 110 and 120 of the air bag 12 could be different from those illustrated. It should further be understood that the invention is applicable to air bags which are not tuck folded in the manner illustrated in FIGS. 6 and 7.

From the above description of the invention, those skilled in the art will perceive improvements, changes and modifications in the invention. For example, more than two or less than two fluid inlet openings can be provided in the wrap, and each fluid inlet opening can have a shape or location different from the illustrated oval shape. Further, the wrap need not be inserted into the inflation fluid volume of the air bag. Such improvements, changes and modifications within the skill of the art are intended to be covered by the appended claims.

Having described the invention, we claim:

1. A vehicle safety apparatus comprising:
   an inflatable vehicle occupant restraint having a deflated folded condition and an inflated condition for protecting an occupant of a vehicle; and
   a flexible wrap encircling said folded inflatable restraint and maintaining said folded inflatable restraint in said folded condition, said flexible wrap having portions which are secured together to maintain said wrap in an encircling relation with said folded inflatable restraint when said inflatable restraint is in the deflated folded condition;
   said flexible wrap having an opening means for receiving inflation fluid and for directing inflation fluid into a predetermined portion of said deflated inflatable restraint to cause said predetermined portion to inflate first.

2. An apparatus as set forth in claim 1 wherein said flexible wrap comprises a sheet material member made from a fluid impermeable material, said opening means comprising a fluid inlet opening formed in said fluid impermeable material for selectively directing inflation fluid through said fluid impermeable material into said predetermined portion of said inflatable restraint.

3. An apparatus as set forth in claim 1 wherein said inflatable restraint when in the inflated condition has upper and lower sections;
   said inflatable restraint when in the deflated condition having a first portion which is turned inside out and received inside a second portion of said inflatable restraint, said first portion of said inflatable restraint forming said lower section of said inflatable restraint when said inflatable restraint is in the inflated condition, said first portion of said inflatable restraint being the final portion of said inflatable restraint to inflate when said inflatable restraint is inflated;
   said inflatable restraint comprising a plurality of layers including a back panel disposed farthest from the vehicle occupant when said inflatable restraint is inflated and a front panel disposed closest to the vehicle occupant when said inflatable restraint is inflated;
   each of said back panel and said front panel having respective upper and lower portions, said upper portions of said back panel and of said front panel forming said upper section of said inflatable restraint when said inflatable restraint is inflated, said lower portions of said back panel and of said front panel forming said lower section of said inflatable restraint when said inflatable restraint is inflated;
   said first portion of said inflatable restraint including said lower portions of said back panel and of said front panel;
   said inflatable restraint having an inflation fluid opening though which inflation fluid is directed to inflate said inflatable restraint, said inflatable restraint having a first condition in which first and second parts of said inflatable restraint are disposed on opposite sides of said inflation fluid opening;

said inflatable restraint having a second condition in which said first part of said inflatable restraint is rolled into a first compact shape and said second part of said inflatable restraint is disposed adjacent to said rolled first part of said inflatable restraint for mounting in the vehicle.

4. A vehicle safety apparatus comprising:

an inflatable vehicle occupant restraint having a deflated folded condition and an inflated condition for protecting an occupant of a vehicle, said inflatable restraint having at least one fabric panel defining an inflation fluid volume for receiving inflation fluid to inflate said inflatable restraint; and a fluid impermeable flexible member wrapped around said folded inflatable restraint and maintaining said folded inflatable restraint in said folded condition, said flexible wrap having portions which are secured together to maintain said wrap in an encircling relation with said folded inflatable restraint when said inflatable restraint is in the deflated folded condition;

said flexible member having an opening means for directing inflation fluid to flow in a predetermined flow path into said inflation fluid volume of said inflatable restraint to inflate said inflatable restraint.

5. An apparatus as set forth in claim 4 wherein said opening means is disposed on a first side of said safety apparatus when said inflatable restraint is in the deflated condition, said flexible member having a tear seam which is disposed on a second side of said safety apparatus opposite from said first side when said inflatable restraint is in the deflated condition.

6. An apparatus as set forth in claim 4 wherein said inflatable restraint when in the inflated condition has upper and lower sections;

said inflatable restraint when in the deflated condition having a first portion which is turned inside out and received inside a second portion of said inflatable restraint, said first portion of said inflatable restraint forming said lower section of said inflatable restraint when said inflatable restraint is in the inflated condition, said first portion of said inflatable restraint being the final portion of said inflatable restraint to inflate when said inflatable restraint is inflated;

said at least one fabric panel of said inflatable restraint comprising a plurality of layers including a back panel disposed farthest from the vehicle occupant when said inflatable restraint is inflated and a front panel disposed closest to the vehicle occupant when said inflatable restraint is inflated;

each of said back panel and said front panel having respective upper and lower portions, said upper portions of said back panel and of said front panel forming said upper section of said inflatable restraint when said inflatable restraint is inflated, said lower portions of said back panel and of said front panel forming said lower section of said inflatable restraint when said inflatable restraint is inflated;

said first portion of said inflatable restraint including said lower portions of said back panel and of said front panel;

said inflatable restraint having an inflation fluid opening though which inflation fluid is directed to inflate said inflatable restraint, said inflatable restraint having a first condition in which first and second parts of said inflatable restraint are disposed on opposite sides of said inflation fluid opening;

said inflatable restraint having a second condition in which said first part of said inflatable restraint is rolled into a first compact shape and said second part of said inflatable restraint is disposed adjacent to said rolled first part of said inflatable restraint for mounting in the vehicle.

7. A vehicle safety apparatus comprising:

an inflatable vehicle occupant restraint having a deflated condition and having an inflated condition for protecting an occupant of a vehicle;

a fluid impermeable flexible wrap encircling said inflatable restraint when said inflatable restraint is in the deflated condition; and an inflator for supplying inflation fluid to said inflatable restraint to inflate said inflatable restraint;

said inflatable restraint having a first part and a second part which are presented toward said inflator when said inflatable restraint is in the deflated condition;

said wrap including a plurality of layers which extend between said first part of said inflatable restraint and said inflator;

said wrap including a single layer which extends between said second part of said inflatable restraint and said inflator;

said single layer of said wrap including at least one fluid inlet opening disposed between said inflator and said second part of said inflatable restraint for receiving inflation fluid from said inflator and for directing inflation fluid through said single layer into said second part of said inflatable restraint to cause said second part of said inflatable restraint to inflate first.

8. An apparatus as set forth in claim 7 wherein a first end portion of said wrap is rolled up with said first part of said inflatable restraint and a second end portion of said wrap is disposed outside of said inflatable restraint in a position encircling said inflatable restraint when said inflatable restraint is in the deflated condition.

9. An apparatus as set forth in claim 7 wherein said inflatable restraint has at least one fabric material panel which defines an inflation fluid volume for receiving inflation fluid to inflate said inflatable restraint, said at least one fluid inlet opening directing inflation fluid to flow in a predetermined flow path into said inflation fluid volume of said inflatable restraint to inflate said inflatable restraint.

10. An apparatus as set forth in claim 9 wherein said wrap has a first end portion which is disposed in said inflation fluid volume adjacent to said at least one fabric material panel when said inflatable restraint is in the deflated condition.

11. An apparatus as set forth in claim 10 wherein said at least one fabric material panel includes a front panel and a back panel of said inflatable restraint, said first end portion of said flexible wrap extending in said inflation fluid volume between said front panel and said back panel, said flexible wrap having a second end portion which encircles said inflatable restraint when said inflatable restraint is in the deflated condition.

12. An apparatus as set forth in claim 7 wherein said inflatable restraint when in the inflated condition has upper and lower sections;

said inflatable restraint when in the deflated condition having a first portion which is turned inside out and received inside a second portion of said inflatable restraint, said first portion of said inflatable restraint forming said lower section of said inflatable restraint when said inflatable restraint is in the inflated condition, said first portion of said inflatable restraint being the final portion of said inflatable restraint to inflate when said inflatable restraint is inflated;

said inflatable restraint comprising a plurality of layers including a back panel disposed farthest from the vehicle occupant when said inflatable restraint is inflated and a front panel disposed closest to the vehicle occupant when said inflatable restraint is inflated;

each of said back panel and said front panel having respective upper and lower portions, said upper portions of said back panel and of said front panel forming said upper section of said inflatable restraint when said inflatable restraint is inflated, said lower portions of said back panel and of said front panel forming said lower section of said inflatable restraint when said inflatable restraint is inflated;

said first portion of said inflatable restraint including said lower portions of said back panel and of said front panel;

said inflatable restraint having an inflation fluid opening though which inflation fluid is directed to inflate said inflatable restraint, said inflatable restraint having a first condition in which said first and second parts of said inflatable restraint are disposed on opposite sides of said inflation fluid opening;

said inflatable restraint having a second condition in which said first part of said inflatable restraint is rolled into a first compact shape and said second part of said inflatable restraint is disposed adjacent to said rolled first part of said inflatable restraint for mounting in the vehicle.

13. A vehicle safety apparatus comprising:

an inflatable vehicle occupant restraint having a deflated condition and an inflated condition for protecting an occupant of a vehicle; and a flexible wrap encircling said inflatable restraint when said inflatable restraint is in the deflated condition;

said flexible wrap having an opening for receiving inflation fluid and for directing inflation fluid into a predetermined portion of said deflated inflatable restraint to cause said predetermined portion to inflate first;

a first end portion of said wrap being folded with a first part of said inflatable restraint and a second end portion of said wrap being disposed outside of said inflatable restraint in a position encircling said inflatable restraint when said inflatable restraint is in the deflated condition.

14. A vehicle safety apparatus comprising:

an inflatable vehicle occupant restraint having a deflated condition and an inflated condition for protecting an occupant of a vehicle; and a flexible wrap encircling said inflatable restraint when said inflatable restraint is in the deflated condition;

said flexible wrap having an opening for receiving inflation fluid and for directing inflation fluid into a predetermined portion of said deflated inflatable restraint to cause said predetermined portion to inflate first;

said wrap including a first layer which extends between an inflator and a first part of said inflatable restraint when said inflatable restraint is in the deflated condition and which does not extend between said inflator and a second part of said inflatable restraint;

said wrap including a second layer having a first section which extends between said inflator and said first part of said inflatable restraint when said inflatable restraint is in the deflated condition and having a second section which extends between said inflator and said second part of said inflatable restraint.

15. A vehicle safety apparatus comprising:

an inflatable vehicle occupant restraint having a deflated condition and an inflated condition for protecting an occupant of a vehicle; and a flexible wrap encircling said inflatable restraint when said inflatable restraint is in the deflated condition;

said flexible wrap having an opening for receiving inflation fluid and for directing inflation fluid into a predetermined portion of said deflated inflatable restraint to cause said predetermined portion to inflate first;

a first part of said inflatable restraint presented toward an inflator being covered with said wrap at a location inside of said opening when said inflatable restraint is in the deflated condition and a second part of said inflatable restraint presented toward said inflator being exposed to said inflator through said opening.

16. A vehicle safety apparatus comprising:

an inflatable vehicle occupant restraint having a deflated condition and an inflated condition for protecting an occupant of a vehicle; and a flexible wrap encircling said inflatable restraint when said inflatable restraint is in the deflated condition;

said flexible wrap having an opening for receiving inflation fluid and for directing inflation fluid into a predetermined portion of said deflated inflatable restraint to cause said predetermined portion to inflate first;

said flexible wrap comprising a sheet material member made from a fluid impermeable material, said opening comprising a fluid inlet opening formed in said fluid impermeable material for selectively directing inflation fluid through said fluid impermeable material into said predetermined portion of said inflatable restraint;

said wrap including a plurality of layers which cover said inflatable restraint when said inflatable restraint is in the deflated condition, said plurality of layers including a single layer which overlies said predetermined portion of said inflatable restraint which inflates first, said single layer including said fluid inlet opening.

17. A vehicle safety apparatus comprising:

an inflatable vehicle occupant restraint having a deflated condition and an inflated condition for protecting an occupant of a vehicle, said inflatable restraint having at least one fabric panel defining an inflation fluid volume for receiving inflation fluid to inflate said inflatable restraint; and a fluid impermeable flexible member wrapped around said inflatable restraint when said inflatable restraint is in the deflated condition;

said flexible member having an opening for directing inflation fluid to flow in a predetermined flow path into said inflation fluid volume of said inflatable restraint to inflate said inflatable restraint;

said flexible member having a first end portion which is disposed in said inflation fluid volume adjacent to said at least one fabric panel when said inflatable restraint is in the deflated condition.

18. An apparatus as set forth in claim 17 wherein said at least one fabric panel includes a front panel and a back panel of said inflatable restraint, said first end portion of said flexible member extending in said inflation fluid volume between said front panel and said back panel, said flexible member having a second end portion which encircles said inflatable restraint when said inflatable restraint is in the deflated condition.

19. A vehicle safety apparatus comprising:

an inflatable vehicle occupant restraint having a deflated condition and an inflated condition for protecting an occupant of a vehicle, said inflatable restraint having at least one fabric panel defining an inflation fluid volume for receiving inflation fluid to inflate said inflatable restraint; and a fluid impermeable flexible member wrapped around said inflatable restraint when said inflatable restraint is in the deflated condition;

said flexible member having an opening for directing inflation fluid to flow in a predetermined flow path into said inflation fluid volume of said inflatable restraint to inflate said inflatable restraint;

said flexible member including a plurality of layers which cover said inflatable restraint when said inflatable restraint is in the deflated condition, said plurality of layers including a single layer which overlies a predetermined portion of said inflatable restraint which inflates first, said single layer including said opening.

20. A vehicle safety apparatus comprising:

an inflatable vehicle occupant restraint having a deflated condition and an inflated condition for protecting an occupant of a vehicle, said inflatable restraint having at least one fabric panel defining an inflation fluid volume for receiving inflation fluid to inflate said inflatable restraint;

a fluid impermeable flexible member wrapped around said inflatable restraint when said inflatable restraint is in the deflated condition;

said flexible member having an opening for directing inflation fluid to flow in a predetermined flow path into said inflation fluid volume of said inflatable restraint to inflate said inflatable restraint; and an inflator for supplying inflation fluid to said inflatable restraint to inflate said inflatable restraint;

said inflatable restraint having a first part and a second part which are presented toward said inflator when said inflatable restraint is in the deflated condition;

said flexible member including a plurality of layers which extend between said first part of said inflatable restraint and said inflator;

said flexible member including a single layer which extends between said second part of said inflatable restraint and said inflator;

said single layer of said flexible member including said opening, said opening being disposed between said inflator and said second part of said inflatable restraint for receiving inflation fluid from said inflator and for directing inflation fluid through said single layer into said second part of said inflatable restraint to cause said second part of said inflatable restraint to inflate first.

21. A vehicle safety apparatus comprising:

an inflatable vehicle occupant restraint having a deflated folded condition and an inflated condition for protecting an occupant of a vehicle;

a retaining ring securable to said inflatable restraint, said retaining ring containing at least a portion of said inflatable restraint when said inflatable restraint is in said folded condition; and a flexible wrap encircling said folded inflatable restraint and said retaining ring, and maintaining said folded inflatable restraint in said folded condition, said flexible wrap having portions which are secured together to maintain said wrap in an encircling relation with said folded inflatable restraint when said inflatable restraint is in the deflated folded condition;

said flexible wrap having an opening for receiving inflation fluid and for directing inflation fluid into said deflated inflatable restraint to cause said inflatable restraint to inflate.

* * * * *